(12) United States Patent
Willis et al.

(10) Patent No.: US 6,938,123 B2
(45) Date of Patent: Aug. 30, 2005

(54) SYSTEM AND METHOD FOR RAID STRIPING

(75) Inventors: Kenneth Willis, Castle Rock, CO (US); Stephen S. Selkirk, Broomfield, CO (US)

(73) Assignee: Storage Technology Corporation, Louisville, CO (US)

(*) Notice: Subject to any disclaimer, the term of this patent is extended or adjusted under 35 U.S.C. 154(b) by 267 days.

(21) Appl. No.: 10/198,863

(22) Filed: Jul. 19, 2002

(65) Prior Publication Data

US 2004/0015655 A1 Jan. 22, 2004

(51) Int. Cl.[7] .............................................. G06F 12/00
(52) U.S. Cl. ........................................ 711/114; 714/6
(58) Field of Search .............................. 711/114, 117; 710/15; 714/6, 114

(56) References Cited

U.S. PATENT DOCUMENTS

| | | | |
|---|---|---|---|
| 6,311,251 B1 | 10/2001 | Merritt et al. | |
| 6,584,582 B1 * | 6/2003 | O'Connor | 714/21 |
| 6,651,137 B2 * | 11/2003 | Baek et al. | 711/114 |
| 6,687,765 B2 * | 2/2004 | Surugucchi et al. | 710/15 |

FOREIGN PATENT DOCUMENTS

EP     0689125 A2    12/1995

OTHER PUBLICATIONS

Rosenblum, M. et al.: "The Design and Implementation of a Log–Structured File System". Operating Systems Review (SIGOPS), ACM Headquarter, New York, US, vol. 25, No. 5, 1991, pp. 1–15, XP000288298, p. 1–p. 6.

Massiglia, P.: "The Raidbook, Chapter 11: Dynamic Data Mapping". The RAID Book. A Storage System Technology Handbook, Feb. 1997, pp. 197–208, XP002296549, p. 197–p. 202.

* cited by examiner

Primary Examiner—Kevin Verbrugge
(74) Attorney, Agent, or Firm—Brooks Kushman P.C.

(57) ABSTRACT

In a redundant storage subsystem including an array controller and a group composed of a plurality of storage devices, a method is provided. The method includes logically parsing each storage device of the group into a corresponding number of allocation units. A stripe size is selected, and a series of writing operations is performed. Each writing operation includes selecting a subset of the plurality of storage devices based on the stripe size, and writing the stripe of data to the subset of the plurality of storage devices. The selected subset over the series of writing operations varies from operation to operation.

20 Claims, 3 Drawing Sheets

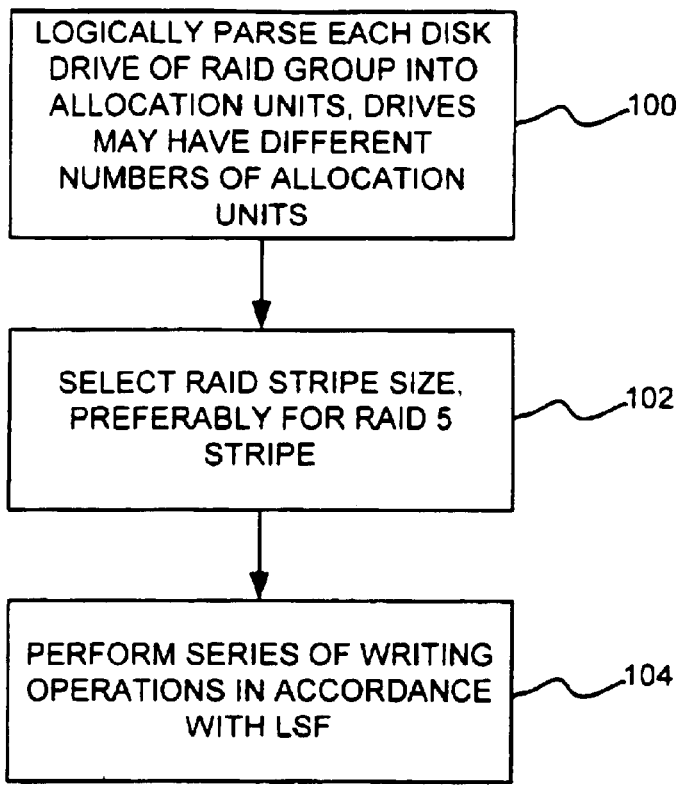
Fig_3
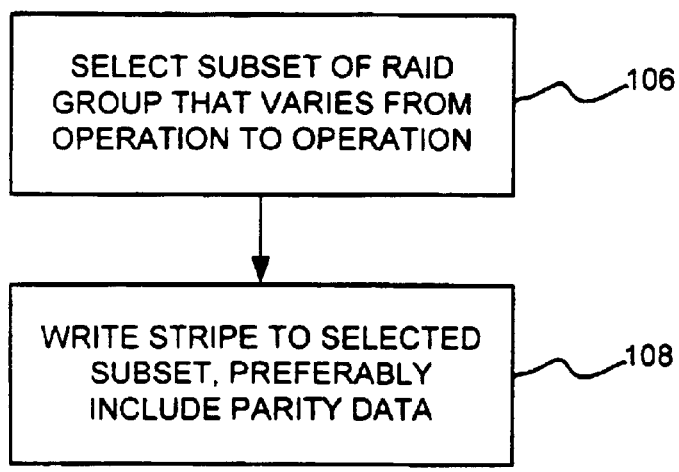
Fig_4

SYSTEM AND METHOD FOR RAID STRIPING

BACKGROUND OF THE INVENTION

1. Field of the Invention

The present invention relates to redundant array of inexpensive disks (RAID) subsystems and to systems and methods for RAID striping.

2. Background Art

RAID disk subsystems are traditionally organized by associating a set of disk drives into a RAID group. U.S. Pat. No. 5,550,998 describes an existing RAID system. The RAID group is often viewed as a single logical unit. The capacities of disk drives have been increasing to such a size that operating systems or file systems may not utilize all of the space of such a RAID group. In an attempt to resolve this, some RAID products are capable of partitioning a bound drive set into multiple logical units.

In most cases, with this organization, the RAID subsystem requires all units to be homogeneous. In only a few cases, heterogeneous units with similar attributes can be combined into a RAID group. In general, these units must meet the lowest common denominator of capacity so as to have a consistent device relative address for RAID stripe allocation.

The one exception to this method of associating RAID groups is the HP AutoRAID, available from Hewlett-Packard Company, Palo Alto, Calif. In the HP AutoRAID, all drives compromise the basis to one of two RAID sets. There is one RAID 1 and one RAID 5 RAID set. Drives are partitioned into allocation units of the same size and space is allocated to either of the two RAID groups on request. Capacity is managed across all units to satisfy the RAID group requirement.

For the foregoing reasons, there is a need for an improved system and method for RAID striping that may accommodate heterogeneous units and that is more flexible than existing techniques for associating RAID groups.

SUMMARY OF THE INVENTION

It is, therefore, an object of the present invention to provide an improved system and method for RAID striping that utilizes a capacity pool which allocates storage on a dynamic size basis.

In carrying out the above object, in a redundant array of inexpensive disks (RAID) subsystem including an array controller and a RAID group composed of a plurality of disk drives, a method is provided. The method comprises logically parsing each disk drive of the RAID group into a corresponding number of allocation units. The method further comprises selecting a RAID stripe size, and performing a series of writing operations. Each writing operation includes selecting a subset of the plurality of disk drives based on the RAID stripe size, and writing the stripe of data to the subset of the plurality of disk drives. The selected subset varies over the series of writing operations from operation to operation.

It is appreciated that the RAID group may include disk drives that have different numbers of allocation units. And preferably, the series of writing operations is performed in accordance with a log structured file system. Further, preferred implementations write parity data during writing operations. More preferably, the series of writing operations is performed in accordance with RAID 5.

Further, in carrying out the present invention, a redundant array of inexpensive disks (RAID) system is provided. The system comprises an array controller, a RAID group, and a medium. The RAID group is composed of a plurality of disk drives. Each disk drive is logically parsed into a corresponding number of allocation units. The medium has instructions stored thereon to direct the array controller to perform a series of writing operations. Each writing operation includes selecting a subset of the plurality of disk drives based on a predetermined RAID stripe size. Each writing operation further includes writing the stripe of data to the subset of the plurality of disk drives. The selected subset varies over the series of writing operations from operation to operation.

It is appreciated that the RAID group may include disk drives that have different numbers of allocation units. And preferably, the series of writing operations is performed in accordance with a log structured file system. Further, preferred implementations write parity data during writing operations. More preferably, the series of writing operations is performed in accordance with RAID 5.

Further, in carrying out the present invention, methods and systems are not limited to RAID and disk drives. Methods and systems may employ an array controller and a group composed of a plurality of storage devices (for example, tapes), not limited to disk drives, and striping is not limited to RAID stripes. As used herein, the term "RAID" means any general disk array where data is stored across multiple disks and is not limited to any specific disk array implementation. As used herein, the term "RAID group" means any group of disks present in a RAID implementation, and the group may be composed of drives from the same array or drives from different arrays. Similarly, as used herein, any other terms modified by the term "RAID" such as RAID system or RAID stripe are to be interpreted broadly and not limited to any specific implementation.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 3 is a block diagram illustrating a preferred method of the present invention; and FIG. 4 is a block diagram illustrating writing operations in a preferred method of the present invention.

DETAILED DESCRIPTION OF THE PREFERRED EMBODIMENT

Figure 1:
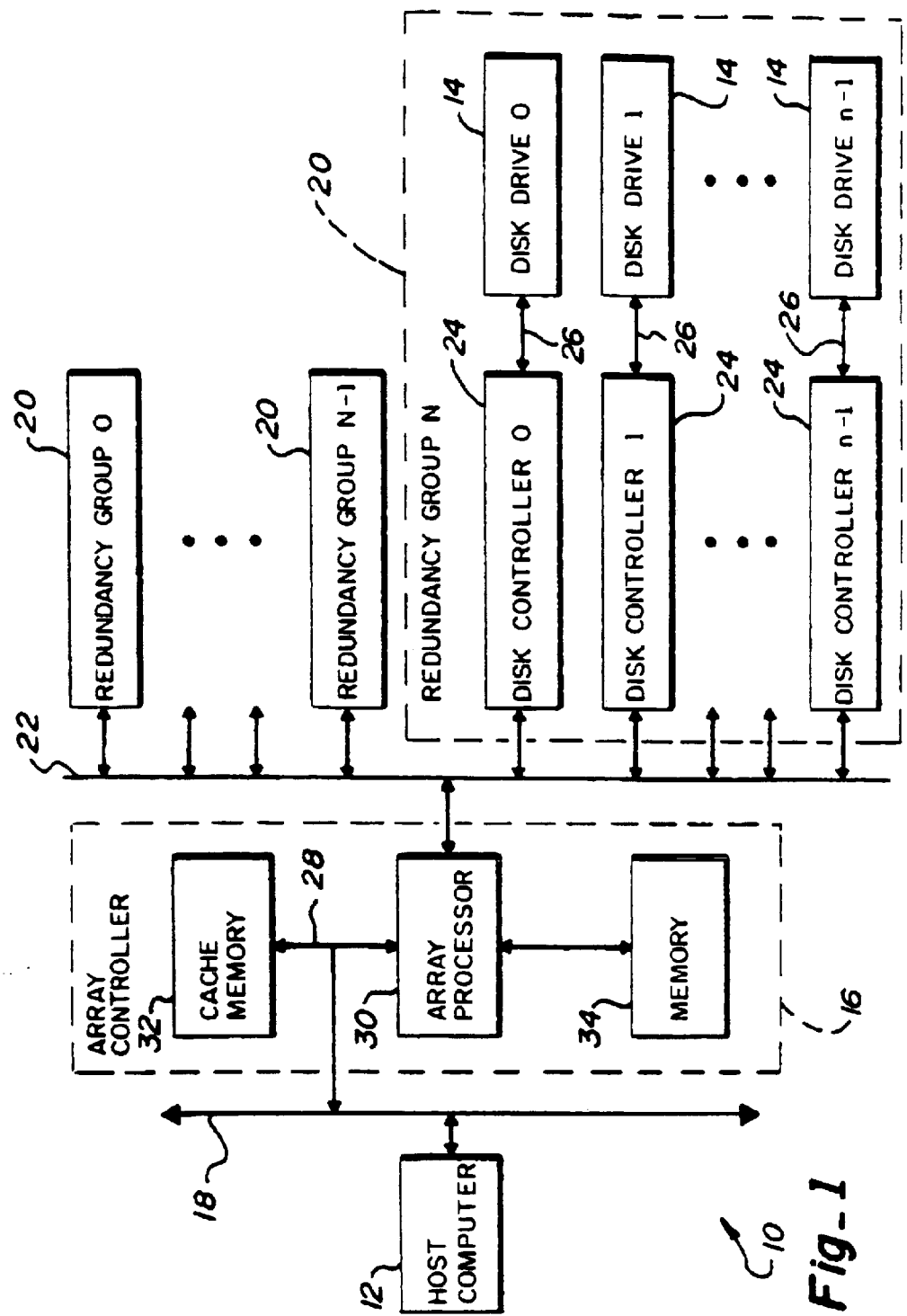
FIG. 1 is a block diagram of a RAID storage system of the present invention.

As shown in FIG. 1, a RAID mass storage system 10 includes an array controller 16 which is connected to a host computer 12 by a host bus 18. The array controller 16 is also connected to a plurality of redundancy groups 20. The number (N) of redundancy groups is variable, and in some cases there may be only one group. Each redundancy group 20 is connected to the array controller 16 by an array bus 22. It is over the bus 22 that read and write commands and the data to be read or written are transferred between each redundancy group 20 and the array controller 16.

Each redundancy group 20 includes a disk controller 24 connected to each disk drive 14. Each disk controller 24 is connected to the bus 22 and receives the data and the read and write commands addressed to it by the array controller 16. In response to the read and write commands, the addressed disk controller delivers control signals to the attached disk drive 14 over connection 26 to accomplish the read and write operations which are commanded by the array controller 16. In response to a read command from the disk controller 24, the attached disk drive 14 reads data previously written at the identified location on a rotating disk of the disk drive, and this data is supplied by the disk controller on the bus 22 to the array controller 16. The array controller normally supplies the data to the host bus 18 where it is received by the host computer 12. In response to a write command from the disk controller 24, the attached disk drive 14 writes the data supplied on the bus 22 by the array controller 16 to specific addressed locations on a rotating disk of the disk drive. The data written during a write operation has usually been previously supplied by the host computer 12 to the array controller 16.

The array controller 16 includes an internal bus 28 which is connected to an array processor 30 and to a cache memory 32. The array processor is connected to a memory 34 which includes the programming instructions for the processor 30 to obtain the various functional aspects of the array controller. One of the functional aspects of the array controller 16 is to correlate input/output (I/O) commands and the data from the host computer 12 with the physical locations of where the data is to be read or written in the RAID system 10. Typically this correlation function is achieved by use of a mapping table which associates the I/O commands from the host computer 12 to the redundancy groups, the disk drives and the locations on the disks of the disk drives where the data is to be written or read. This mapping algorithm is particularly useful if the RAID system is emulating another type of mass storage system. The mapping algorithm is dynamic in the sense that the mapping table is continually updated to reflect information concerning each new block of data which is written and to reflect memory locations which are invalid due to the data therein having been read, modified and recorded at another location. Another one of the functional aspects of the array controller 16 is to check the cache memory 32 to attempt to fulfill I/O read/write operations from the host computer 12. If the information sought to be read is within the cache memory 32, a read operation is directed to the cache memory 32 and not to the disk drives 14 of the redundancy groups 20. Number, location, and function of the disk controllers may vary depending on the architecture implementation. Further, disk controllers may be implemented in any suitable way. Further, the invention is independent of interface type and may use, for example, ATA, SCSI, or Fibre Channel.

Figure 2:
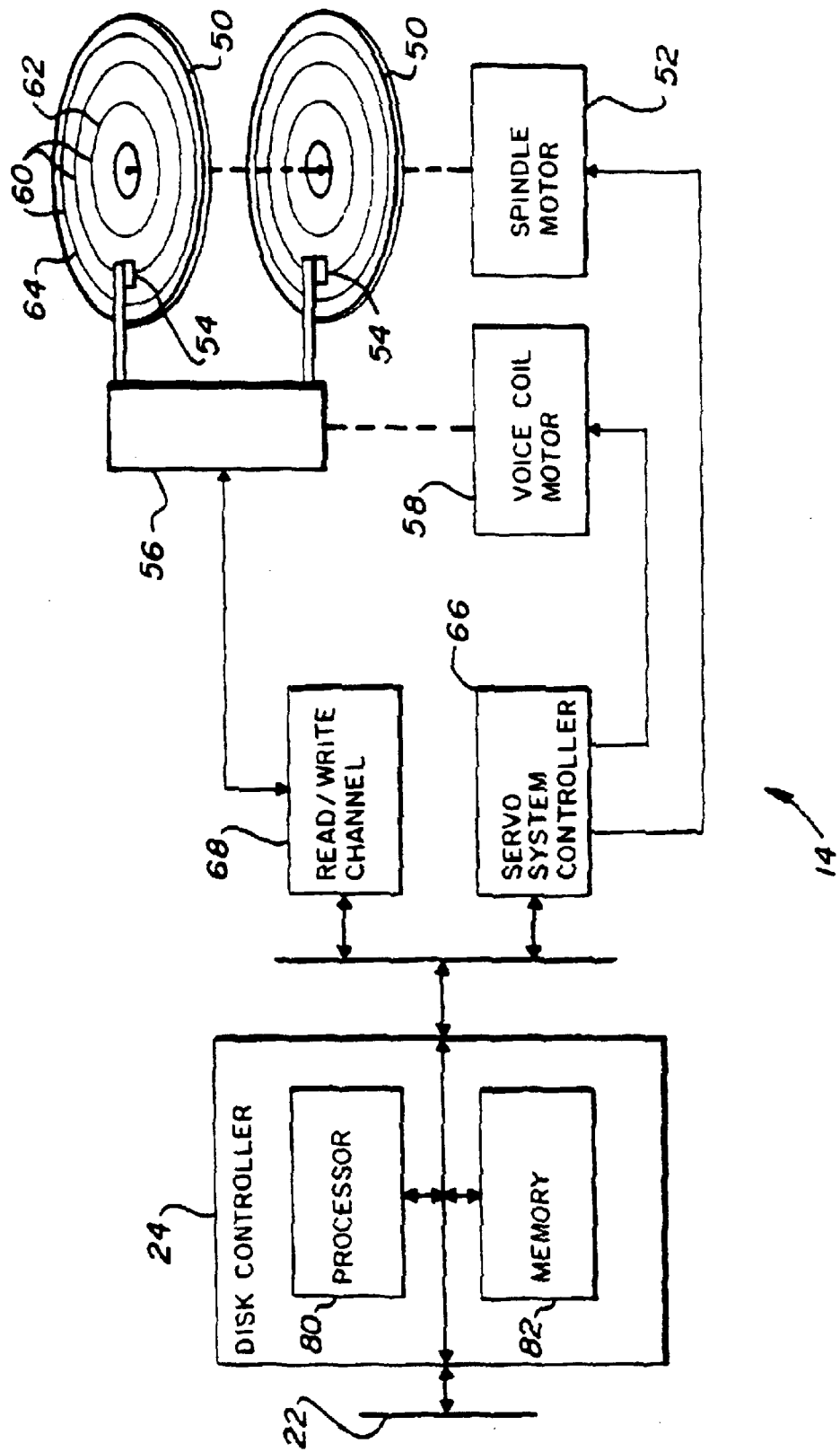
FIG. 2 is a generalized schematic illustration of one of the individual disk drives incorporated in each redundancy group of the RAID system shown in FIG. 1.

More details concerning each disk drive 14 are shown in FIG. 2. Each disk drive 14 includes at least one, and usually a considerably greater number of magnetic disks 50 or platters which are rotated at an essentially constant fixed rate by a spindle motor 52. Data is written to or read from the magnetic disks 50 by a transducer or read/write head 54. The head 54 is connected to an actuator 56 which is moved by a voice coil motor 58 to position the head 54 above different locations on the rotating disks 50.

The data is written on the disks 50 by magnetic characters induced into the magnetic surface of the disks 50 by signals applied to the heads 54. The magnetic characters are recorded in concentric curvi-linear tracks 60 described by the rotation of the disks when the heads 54 are located in a stationary location. These concentric tracks 60 extend from a track 62 at an inner diameter of the magnetic recording surface of the disk to an outer diameter track 64. Typically, there are a large number of tracks 60 recorded on each disk 50, for example 2,000. Each track has its own track number, usually starting with the inner diameter track 62 and extending to the outer diameter track 64.

Each disk drive 14 also includes a servo system controller 66. The servo system controller 66 supplies control signals to the voice coil motor 58 and the spindle motor 52. The control signals to the voice coil motor 58 move the actuator 56 to position the heads 54 at a predetermined track for reading preexisting data from the track or for writing data to the selected track. The control signals supplied to the spindle motor 52 maintain a desired rotational rate of the disks 60.

Each disk drive 14 also includes a read/write channel 68. The read/write channel 68 accomplishes a write operation by applying signals from the disk controller 24 to the head 54. The signals applied to the head 54 induce the magnetic characters into the disks 50 in the tracks 60 to record the data. In a read operation, the read/write channel 68 is adapted to receive the signals induced in the heads 54 by the magnetic characters in the tracks 60. The disk controller 24 receives the signals read, conditions them and applies them to the array bus 22. Disk controller 24 utilizes processor 80 and memory 82 to perform its operations.

In order to accomplish successful read/write operations, the position of the head 54 is coordinated while adapting the read/write channel 68 to perform the read operation or the write operation. The time required to move the head 54 from one track to the desired track at which a read or a write operation is to be performed is referred to as the seek time. The time required to adapt the read/write channel 68 to perform the read or write operation is called the selection time. The selection time is that finite amount of time required to activate the necessary electronic components within the read/write channel 68 to perform the read/write operation.

In accordance with the present invention, a capacity pool such as any one of RAID groups 20 allocates storage on a dynamic size basis. And, there may be any number of groups each including any number of drives. The addressing architecture preferably operates under a log structured file (append write) storage space management system and satisfies the space requirements for each RAID group configured on the subsystem. Other approaches may also provide the needed dynamically variable allocation.

Traditional RAID subsystems determine a set of disks in a RAID group and associate a logical unit with a set of physical disk drives or a partitioned set of the drives. In accordance with the present invention, units of allocation for a RAID stripe are obtained from a set of disk drives. Logic unit association with a specific fixed set of drives is not needed. The set can be the minimal amount of disks necessary for the required stripe size. However, unlike conventional RAID disk subsystems, the set can include a grouping of disks, none of which is the same type and model as the others. The stripe size is spread across the subset of the set of drives where the subset includes the required number of units for the RAID stripe. The next stripe written could include some of the previous drives, but also some drives in the domain which can better satisfy a space and load balance fit. The stripe size is normally selected such that the number of disk drives needed to write the stripe is less than the total number of disk drives available. If the number of allocation units needed exceeds the number of disk drives available, the stripe can be split and additional party blocks added.

The following is used as an example. Assume a set of 6 disk drives. Assume that the RAID stripe selected is a 4+1

RAID 5 group. Assume for this example's simplicity, each drive can be logically parsed into 1000 allocation units of space. The combination of five allocation units equals the stripe size. Four allocation units for data, each on a different drive, are combined with one allocation unit for parity data to be written as one stripe. The data units are not required to be symmetrical in location, that is, are not required to occupy the same physical addresses on each disk. Each unit is maintained as a discrete unit and not tied geometrically to the other units. Following the allocation and RAID stripe write, five drives have 999 data allocation units free and available for allocation, while they each have one data allocation unit not available (allocated and written).

The next data write operation is initiated. The space management mechanism acquires five more data allocation units, four for data and one for parity data. In this case, the drive with the 1000 units available is selected to provide one unit. It could be either a data or parity unit, but for this example consider the unit a parity unit. Following this allocation and RAID stripe write, the first drive has 999 units free for allocation, the next four drives have 998, and the last drive has 999 units.

In addition to the allocation of stripes freely across the disk drives in a pool of disk drives, stripes may use different RAID configurations. For example, a 4+1 RAID 5 stripe could be followed a 1+1 mirror, followed by a 3+1 RAID 4 stripe.

By using the disk allocation units as a storage pool rather than the traditional allocation of disk drives as the basic unit to the RAID group, the storage subsystem is able to have a technical advantage in two ways. First, drives from different vendors and drives having different types can be mixed without concerns of equal drive geometry and symmetry. This allows for field upgrades and spares replacement on a drive availability basis. Second, space allocation concepts also permit field upgrades at a drive basis. Traditional RAID units required one of two actions. Either unload, unbind, rebind, and reload the data on the RAID group, or, insure sufficient drives are added so as to constitute a new RAID group.

FIG. 3 illustrates a preferred method of the present invention. At block 100, each disk drive of a RAID group is logically parsed into a corresponding number of allocation units. The drives may have different numbers of allocation units. At block 102, the RAID stripe size is selected. Preferably, the series of writing operations is performed in accordance with RAID 5. At block 104, the series of writing operations is performed in accordance with a log structured file system.

FIG. 4 illustrates a preferred method for performing the series of writing operations. At block 106, the subset of drives of the RAID group selected for writing a stripe varies from operation to operation. At block 108, the stripe is written to the selected subset, and preferably includes parity data.

It is appreciated that embodiments of the present invention advantageously utilize a capacity pool to allocate storage on a dynamic size basis. Embodiments of the present invention may utilize algorithms for selection/exclusion of drives to use to store a stripe unit. Further, embodiments of the present invention may utilize algorithms for optimizing the placement of stripes, stripe width, and stripe depth. Such optimization may vary depending on an optimization goal based on either a user set policy for performance and capacity tradeoffs, or system discovered access characteristics and automated policy. Further, embodiments of the present invention are not limited to log structured file systems. In addition, embodiments of the present invention may utilize migration and resizing of stripes to handle failures/replacements/etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a redundant array of inexpensive disks (RAID) subsystem including an array controller and a RAID group composed of a plurality of disk drives, the method comprising:

logically parsing each disk drive of the RAID group into a corresponding number of allocation units; and performing a series of writing operations, each writing operation including selecting a RAID stripe size, selecting a subset of the plurality of disk drives based on the RAID stripe size, and writing the stripe of data to the subset of the plurality of disk drives, wherein the selected subset of the plurality of disk drives over the series of writing operations varies from operation to operation to achieve dynamic selection of allocation units for write operations.

2. The method of claim 1 wherein the RAID group includes disk drives that have different numbers of allocation units.

3. The method of claim 1 wherein performing the series of writing operations is performed in accordance with a log structured file system.

4. The method of claim 1 wherein each write operation includes the writing of parity data.

5. The method of claim 4 wherein performing the series of writing operations is performed in accordance with RAID 5.

6. A redundant array of inexpensive disks (RAID) system comprising:

an array controller;

a RAID group composed of a plurality of disk drives, each disk drive being logically parsed into a corresponding number of allocation units; and a medium having instructions stored thereon to direct the array controller to perform a series of writing operations, each writing operation including selecting a subset of the plurality of disk drives based on a selected RAID stripe size, and writing the stripe of data to the subset of the plurality of disk drives, wherein the selected subset of the plurality of disk drives over the series of writing operations varies from operation to operation to achieve dynamic selection of allocation units for write operations.

7. The system of claim 6 wherein the RAID group includes disk drives that have different numbers of allocation units.

8. The system of claim 6 wherein the series of writing operations is performed in accordance with a log structured file system.

9. The system of claim 6 wherein each write operation includes the writing of parity data.

10. The system of claim 9 wherein performing the series of writing operations is performed in accordance with RAID 5.

11. In a redundant storage subsystem including an array controller and a group composed of a plurality of storage devices, the method comprising:

logically parsing each storage device of the group into a corresponding number of allocation units; and performing a series of writing operations, each writing operation including selecting a stripe size, selecting a subset of the plurality of storage devices based on the stripe size, and writing the stripe of data to the subset of the plurality of storage devices, wherein the selected subset of the plurality of storage devices over the series of writing operations varies from operation to operation to achieve dynamic selection of allocation units for write operations.

12. The method of claim 11 wherein the group includes storage devices that have different numbers of allocation units.

13. The method of claim 11 wherein performing the series of writing operations is performed in accordance with a log structured file system.

14. The method of claim 11 wherein each write operation includes the writing of parity data.

15. The method of claim 14 wherein performing the series of writing operations is performed in accordance with RAID 5.

16. A redundant storage system comprising:

an array controller;

a group composed of a plurality of storage devices, each storage device being logically parsed into a corresponding number of allocation units; and a medium having instructions stored thereon to direct the array controller to perform a series of writing operations, each writing operation including selecting a subset of the plurality of storage devices based on a selected stripe size, and writing the stripe of data to the subset of the plurality of storage devices, wherein the selected subset of the plurality of storage devices over the series of writing operations varies from operation to operation to achieve dynamic selection of allocation units for write operations.

17. The system of claim 16 wherein the group includes storage devices that have different numbers of allocation units.

18. The system of claim 16 wherein the series of writing operations is performed in accordance with a log structured file system.

19. The system of claim 16 wherein each write operation includes the writing of parity data.

20. The system of claim 19 wherein performing the series of writing operations is performed in accordance with RAID 5.

\* \* \* \* \*